United States Patent
S et al.

(10) Patent No.: US 11,670,181 B2
(45) Date of Patent: Jun. 6, 2023

(54) SYSTEMS AND METHODS FOR AIDING LANDING OF VERTICAL TAKEOFF AND LANDING VEHICLE

(71) Applicant: HONEYWELL INTERNATIONAL INC., Charlotte, NC (US)

(72) Inventors: Anoop S, Bangalore (IN); Mohammed Ibrahim Mohideen, Bangalore (IN); Gang He, Morristown, NJ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 263 days.

(21) Appl. No.: 17/062,781

(22) Filed: Oct. 5, 2020

(65) Prior Publication Data

US 2021/0225180 A1     Jul. 22, 2021

(30) Foreign Application Priority Data

Jan. 22, 2020   (IN)  ............................ 202011002819

(51) Int. Cl.
| | | |
|---|---|---|
| *G06T 3/40* | (2006.01) | |
| *G08G 5/02* | (2006.01) | |
| *B64C 29/00* | (2006.01) | |
| *B64D 47/08* | (2006.01) | |
| *G06T 3/60* | (2006.01) | |

(Continued)

(52) U.S. Cl.
CPC ......... *G08G 5/025* (2013.01); *B64C 29/0025* (2013.01); *B64D 47/08* (2013.01); *G06T 3/40* (2013.01); *G06T 3/60* (2013.01); *G06T 7/70* (2017.01); *G06T 11/00* (2013.01)

(58) Field of Classification Search
CPC .... G06T 3/40; G06T 3/60; G06T 7/70; G06T 11/00
See application file for complete search history.

(56) References Cited

U.S. PATENT DOCUMENTS

| | | | | |
|---|---|---|---|---|
| 11,194,344 B2* | 12/2021 | Li | ........................ | B64C 39/024 |
| 2009/0138138 A1* | 5/2009 | Ferren | .................. | G05D 1/0676 |
| | | | | 359/333 |

FOREIGN PATENT DOCUMENTS

| | | |
|---|---|---|
| CN | 105182994 B | 2/2018 |
| DE | 102009060901 A1 | 7/2011 |

OTHER PUBLICATIONS

Amidi, Omead, "An Autonomous Vision-Guided Helicopter," 08/96, submitted to the Department of Electrical and Computer Engineering in partial fulfillment of the requirements for the degree of Doctor of Philosophy.

(Continued)

*Primary Examiner* — Samantha (Yuehan) Wang
(74) *Attorney, Agent, or Firm* — Lorenz & Kopf LLP

(57) ABSTRACT

The present disclosure relates to a vertical takeoff and landing, VTOL, vehicle having a landing aid and associated methods. The landing aid includes at least one processor is configured to: receive image data from an image capture device, receive altitude data from the altimeter, retrieve template landing pad image data for a target landing pad from the database, scale the template landing pad image data based on the altitude data, compare the scaled template landing pad image data and the image data received from the image capture device to locate the target landing pad therein, thereby providing target landing pad localization data, and control a function of the VTOL vehicle based on the target landing pad localization data.

20 Claims, 4 Drawing Sheets

(51) Int. Cl.
*G06T 11/00* (2006.01)
*G06T 7/70* (2017.01)

(56) References Cited

OTHER PUBLICATIONS

Sharp, C.S., "A Vision System for Landing an Unmanned Aerial Vehicle," Proceedings 2001 ICRA. IEEE International Conference on Robotics and Automation, May 21-26, 2001.
Parrot AR.Drone, Wikipedia, http://en.wikipedia.org/wiki/Parrot_AR.Drone, Sep. 7, 2020.
Elias, Bart, "Pilotless Drones: Background and Considerations for Congress Regarding Unmanned Aircraft Operations in the National Airspace System," CRS Report for Congress, www.crs.gov R42718, Sep. 10, 2012.
"Unmanned Aerial Vehicle," https://en.wikipedia.org/wiki/Unmanned_aerial_vehicle, downloaded on Oct. 1, 2020.
Saripalli, S., et al., "Vision-Based Autonomous Landing of An Unmanned Aerial Vehicle," Proceedings 2002 IEEE International Conference on Robotics and Automation, https://ieeexplore.ieee.org/document/1013656, May 11-15, 2002.
Gallagher, Sean, "Pushing the Wrong Button: Bad Button Placement Leads to Drone Crashes," Mar. 1, 2013.

\* cited by examiner

SYSTEMS AND METHODS FOR AIDING LANDING OF VERTICAL TAKEOFF AND LANDING VEHICLE

CROSS REFERENCE TO RELATED APPLICATION

This application claims priority to Indian Provisional Patent Application No. 202011002819, filed Jan. 22, 2020, the entire content of which is incorporated by reference herein.

TECHNICAL FIELD

The present disclosure generally relates to systems and methods for aiding landing of vertical takeoff and landing, VTOL, vehicle. More particularly, the systems and methods described herein provide for automatically locating a target landing pad and controlling a VTOL vehicle based on the localized target landing pad.

BACKGROUND

There is growing interest in Urban Air Mobility (UAM) concepts powered by Vertical Takeoff and Landing (eVTOL) vehicles, particularly electric or electric hybrid VTOLs (eVTOLs). NASA defines UAM as a safe and efficient system for air passenger and cargo transportation within an urban area, inclusive of small package delivery and other urban Unmanned Aerial Systems (UAS) services, that supports a mix of onboard/ground-piloted and increasingly autonomous operations. Technologies that enable safe, quiet, efficient, affordable urban air operations at scale are emerging. Such technologies use small, heavily automated electric or hybrid vertical lift aircraft. To achieve "low cost" and "light weight" objectives, avionics hardware and software capability should be low cost compared to traditional avionics systems.

Accordingly, an object of the present disclosure is to provide a landing aid for a VTOL vehicle and associated methods using processing efficient software and using a relatively low-cost avionics software and hardware solution. Furthermore, other desirable features and characteristics of the disclosure will become apparent from the subsequent detailed description and the appended claims, taken in conjunction with the accompanying drawings and this background of the disclosure.

BRIEF SUMMARY

The present disclosure provides a vertical takeoff and landing, VTOL, vehicle having a landing aid and associated methods. The landing aid includes at least one processor configured to: receive image data from an image capture device, receive altitude data from an altimeter, retrieve template landing pad image data for a target landing pad from a database, scale the template landing pad image data based on the altitude data, compare the scaled template landing pad image data and the image data received from the image capture device to locate the target landing pad therein, thereby providing target landing pad localization data, and control a function of the VTOL vehicle based on the target landing pad localization data This summary is provided to describe selected concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The herein disclosed landing assistance comes into effect after a VTOL vehicle flies (whether by autopilot and/or through on ground or in air human pilot control) to a position above a target landing pad and is ready to descend vertically towards the target landing pad underneath the VTOL vehicle. The landing aid can, therefore, be considered a so-called "last mile" landing aid. Any pilot in the VTOL vehicle will not have visual contact with the target landing pad and thus will rely on images/video captured by an onboard camera to locate the target landing pad. The pilot and/or autopilot will use imaging data from the camera to align the VTOL vehicle laterally first and then to proceed with vertical descent. For a human pilot particularly, reliability of a displayed image for performing lateral alignment and vertical decent become dependent on distance and visibility between the vehicle and landing area. For autopilot, the target landing pad is located in order to provide a target in directing the VTOL vehicle. The present disclosure proposes to process the captured images to locate the target landing pad using a pre-stored template landing pad characterizing shape and dimension for the target landing pad. The present disclosure proposes to utilize height measurement from an altimeter to perform matching between the pre-stored template and captured images. Accurate height measurements from the altimeter are used to scale the pre-stored template while processing the captured images for locating the target landing pad.

Figure 1:
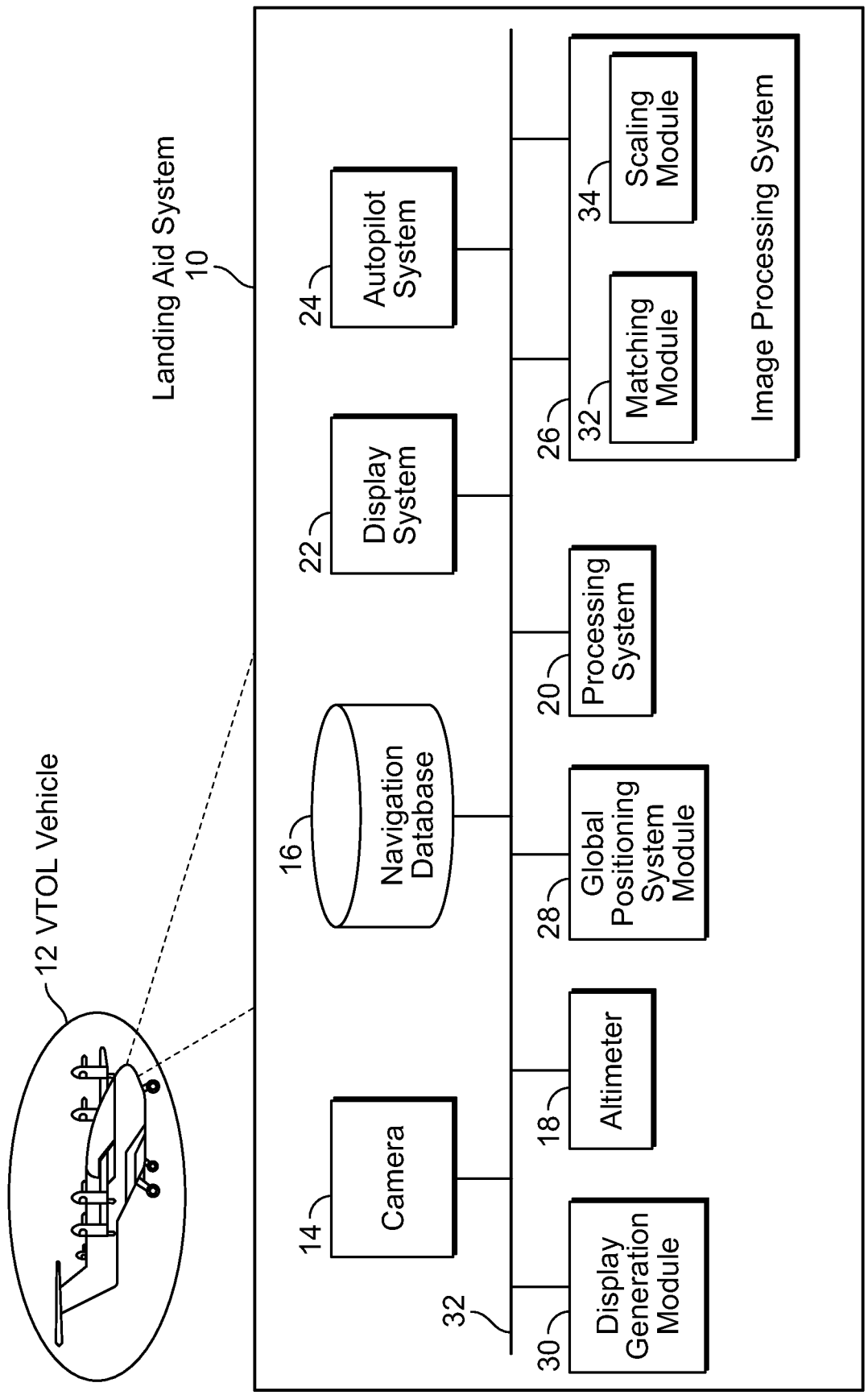
FIG. 1 is a schematic diagram of a landing aid system included in a VTOL, in accordance with the present disclosure.

FIG. 1 depicts an exemplary embodiment of a landing aid system 10 associated with, or included within, a VTOL vehicle 12. This embodiment of system 10 includes, without limitation, a camera 14, a navigation database 16, an altimeter 18, a processing system 20, a display system 22, an autopilot system 24, an image processing system 26, a global positioning system module 28, and a display generation module 30. It should be understood that FIG. 1 is a simplified representation of a landing system 10, and FIG. 1 is not intended to limit the application or scope of the subject matter in any way. In practice, the system 10 and/or VTOL 12 will include numerous other devices and components for providing additional functions and features, as will be appreciated in the art.

VTOL vehicle 12 is one that can hover, take off, and land vertically. VTOL vehicles can include a variety of types of aircraft including fixed-wing aircraft as well as helicopters and other aircraft with powered rotors, such as cyclogyros/cyclocopters and tiltrotors. VTOL vehicle 12 may be an electric or hybrid-electric vertical takeoff and landing aircraft eVTOL or may be otherwise powered. VTOL vehicle 12 can be a human piloted (ground based or cockpit based) aircraft (usually with assistance of an autopilot system 24) or an unmanned aerial vehicle (drone). VTOL vehicle 12 is, in embodiments, a passenger air vehicle (PAV) or does not carry passengers (e.g. a cargo aircraft). In embodiments, VTOL vehicle 12 is a rotorcraft.

Landing aid system 10 includes a camera 14 for capturing still images or video at least of a region beneath VTOL vehicle 12. In embodiments, camera 14 is configured to capture images (still images or as part of video) particularly when VTOL vehicle 12 is located proximal to a target landing pad so as to provide image data that includes an image of the target landing pad. Camera 14 is configured, in some embodiments, to become active when a predetermined proximity to a landing pad is achieved based on location of VTOL vehicle 12 as determined from data from global positioning system module 28 relative to known landing pad coordinates as retrieved from navigation database 16. In embodiments, camera 14 is a monocular camera. However, other vision cameras are possible including stereo cameras, imaging lidar cameras, infrared cameras, etc. Camera 14 can include a plurality of cameras including combinations of different types of cameras such as those described above.

Landing aid system 10 includes an altimeter 18 for measuring altitude of the VTOL vehicle 12. Altimeter 18 outputs altitude data representative of a height of the VTOL vehicle 12 above a ground-based surface. In other embodiments, altitude data is provided with reference to sea level. In embodiments, the altimeter 18 is a radio altimeter. Other types of altimeter 18 are, however, envisaged such as radar, lidar, sonic or atmospheric pressure-based altimeters or differential signal based devices having a transmitter collocated with the point of landing. In embodiments, altimeter 18 is able to provide higher precision altitude data than height data obtained from global positioning system module 28.

Figure 3:
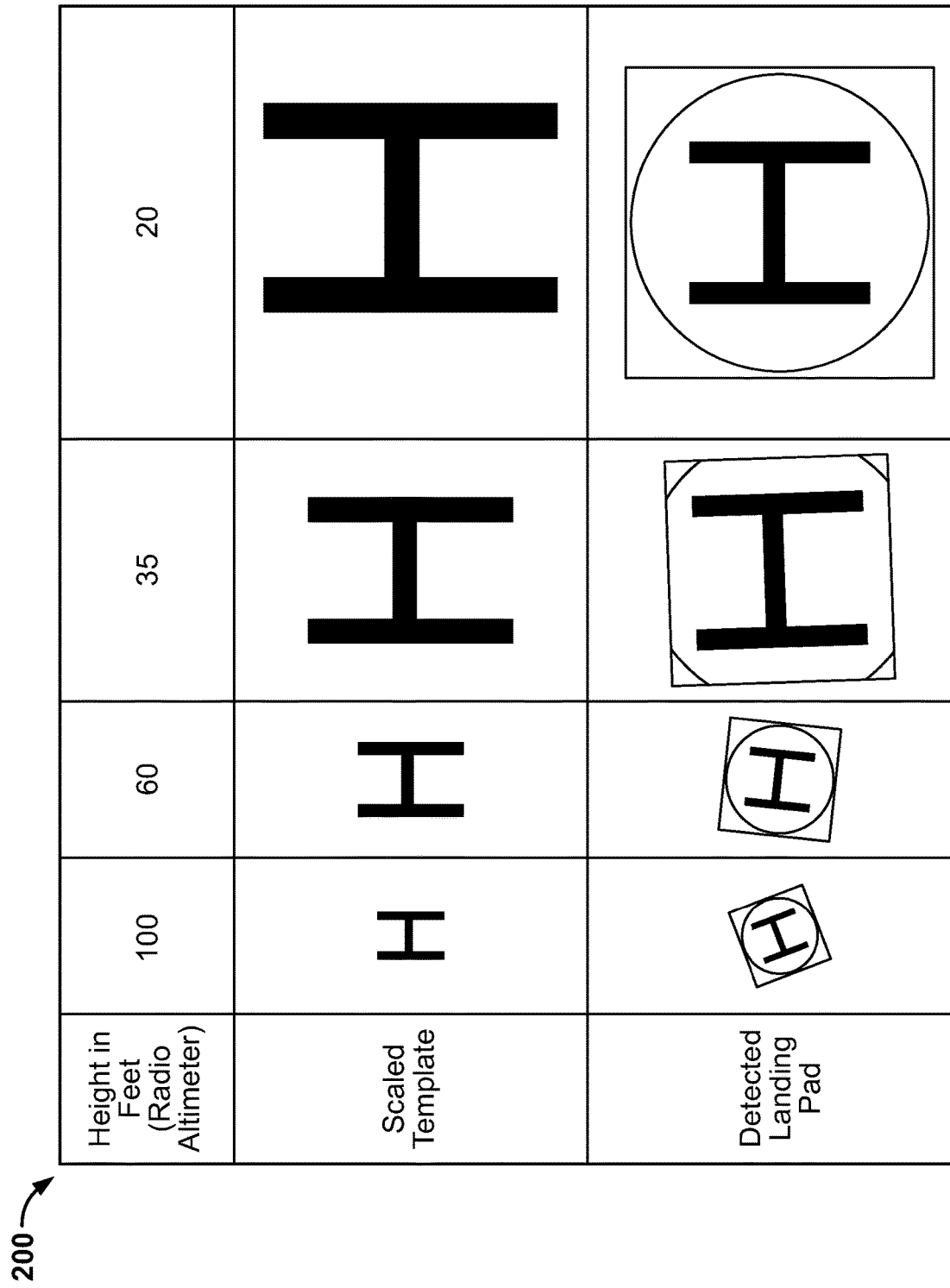
FIG. 3 is a schematic diagram illustrating a scaling process, in accordance with the present disclosure.

Image processing system 26 is configured to process images from camera 14, leveraging altitude data from altimeter 18 in order to more efficiently localize a target landing pad in the images. In embodiments, image processing system 26 is configured to receive each image from camera 14 (or to receive images from camera 14 at a set sampling rate) and to receive a template landing pad image from navigation database 16. The image processing system 26 is configured to scale the template landing pad image based on the altitude data. More specifically, the higher the VTOL vehicle 12 according to the altitude data, the smaller scale transformation is made on the template landing pad image. An example scaling of the template landing pad image is shown in FIG. 3 in which the scaled template landing pad image 200 is transformed to an increasingly larger size as the altitude of the VTOL vehicle 12 reduced. In an embodiment, image processing system 26 is configured to execute an image comparison algorithm that compares the scaled template landing pad image and an image from the camera 14. The target landing pad will only make up a portion of the image from the camera 14 and the image comparison algorithm is configured to use the scaled template landing pad image to search the image space in the image data from the camera 14 for any matching image and to output localization data specifying location of target landing pad in the image from the camera 14. By using a scaled version of the template landing pad, a degree of freedom has been removed from the comparison algorithm, making the comparison process more efficient and accurate, thereby allowing faster response times and/or lower processing power. The image processing algorithm may further scale image in a non-uniform way when attitude of the VTOL vehicle 12 may not be entirely perpendicular to the landing images with fixed mounted camera. In the case, VTOL vehicle 12 may pitch up to counter certain wind effects, images scaling along the direction of approach may be slightly larger than the direction perpendicular to the approach, in order to generate the image for comparison with a stored template.

In embodiments, image processing system 26 includes a scaling module 34 that is configured to scale an input template landing pad based on altitude data and to output the scaled template landing pad 200 as exemplified in FIG. 3. Any known scaling algorithm can be used such as one that determines a scaling parameter in proportion to altitude of the VTOL vehicle 12 and that multiplies, by the scaling parameter, width and height of a template landing pad retrieved from the navigation database 16. In some embodiments, altitude data used by scaling module 34 is adjusted from altitude data from altimeter 18 to take into account height of target landing pad above ground. That is, height of target landing pad above ground is known from data for that target landing pad obtained from navigation database 16 and height of VTOL vehicle 12 above ground is known from altitude data from altimeter. Height of VTOL vehicle 12 above target landing pad is determined by image processing system 26 by subtracting height of target landing pad above ground from the altitude of the VTOL vehicle 12 above ground, which is then used to determine the scaling parameter.

In embodiments, image processing system 26 includes a matching module 32 that is configured to execute the comparison process described above, specifically to receive the scaled template landing pad and the image from the camera 14, to perform the comparison therebetween and to output localization data representing a localized area in image space corresponding to an identified target landing pad. In embodiments, the matching module 32 is configured to execute an image matching algorithm such as a template matching algorithm. Various template matching algorithms are known in the art. Feature-based or area-based template matching algorithms can be used. The template matching algorithm can use a cross-correlation, or a normalized cross-correlation function, to determine a similarity score representative of similarity between the scaled template landing pad and a selected region of the captured image. The template matching function may perform such template matching throughout the image search space in order to find an area or point of highest match based on the similarity score. In some embodiments, the template matching algorithm further takes into account multiple rotated instances of the scaled target template landing pad so that the search in image spaced for highest match encompasses multiple rotated versions of the scaled target template landing pad. In this way, the matching algorithm is operational irrespective of angle of the target landing pad in the image from the camera 14. Based on finding a point or area of highest match from the similarity score, the template matching algorithm outputs localization data representing a position or area of the image corresponding to the target landing pad. In some embodiments, efficiency of the matching module 32 can be further improved by additional image processing steps such as by using edge-based matching, whereby edges of the target landing pad in the image from camera 14 and edges from the template landing pad are extracted for a more efficient comparison process. Further image processing steps performed by the image processing system 26 on the image from the camera 14 can include grey scale conversion, thresholding and noise filtering for enhanced image processing efficiency.

In accordance with various embodiments, landing aid system 10 includes a navigation database 16 that stores navigation data used by various avionics systems including autopilot system 24 and image processing system 26. In embodiments, a flight plan is stored in navigation database 16, which includes description of way points from takeoff to landing. In embodiments, navigation database 26 includes data describing location of the target landing pad, such as coordinates of the target landing pad, and template landing pad image data. In some embodiments, a skyport may have multiple landing pads each identified by a landing pad ID that is marked on the landing pads. Navigation database 16 is configured to store the template landing pad image as well as the associated ID (e.g. as an image) so that image processing system 26 can localize not only the target landing pad, but also identify the correct ID from a plurality target landing pads at a particular skyport. Navigation database 16 may store a plurality of different types of template landing pads and image processing system 26 may perform the template matching based on each template type or navigation database 16 may identify the template landing pad type in association with the target landing pad data field.

In accordance with various embodiments, landing aid system 10 includes an autopilot system 24 that is configured to fly the VTOL vehicle 12 along a flight path obtained from navigation database 16. Autopilot system 24 is configured to automate tasks, such as maintaining an altitude, climbing or descending to an assigned altitude, turning to and maintaining an assigned heading, intercepting a course and guiding the VTOL vehicle 12 between waypoints that make up a flight plan. Autopilot system 24 can operate fully autonomously or using varying degrees of human pilot assistance. In embodiments, autopilot system 24 is configured to obtain global position data from global positioning system module 28 and to track the VTOL vehicle 12 along the flight path based thereon. Autopilot system 24 is configured to control various actuators of the VTOL vehicle 12 such as independent control of rotational speed of a plurality of rotors. Autopilot system 24, or some other sub-system of landing aid system 10, is configured to determine when the VTOL vehicle 12 is located within a predetermined proximity to the target landing pad based on known location of the target landing pad from the navigation database 16 and location of the VTOL vehicle 12 determined using data the global positioning system module 28. The predetermined proximity may be about one mile, in a specific example embodiment. When the predetermined proximity has been determined, image processing system 26 is activated to commence searching for, and localizing, the target landing pad in images from the camera 14. In some embodiments, localization data representing the location of the target landing pad is used by autopilot system 24 in order to automatically control lateral positioning during vertical descent when landing. That is, autopilot system 24 is configured to transform localization data from image processing system 26 into real world coordinates by executing a transformation function and to navigate the VTOL vehicle 12 based on the real-world coordinates.

Figure 4B:
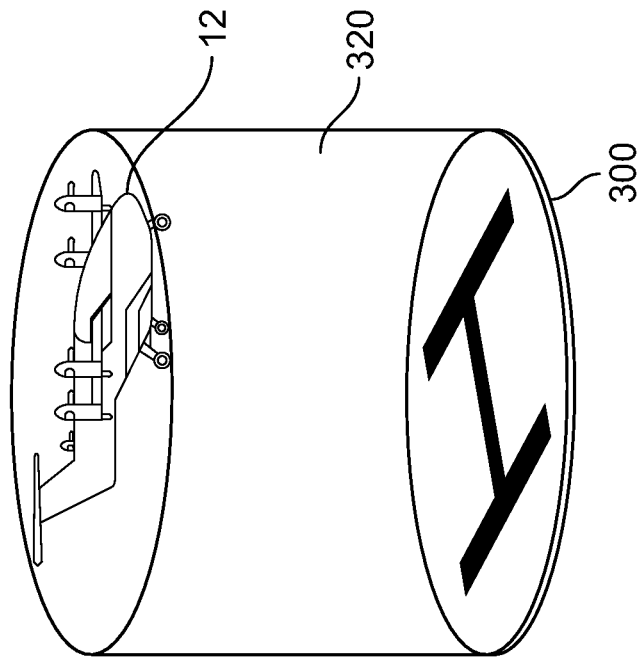
FIGS. 4A and 4B illustrate exemplary displays indicating lateral offset/alignment of a VTOL vehicle relative to a target landing pad, in accordance with the present disclosure.
Figure 4A:
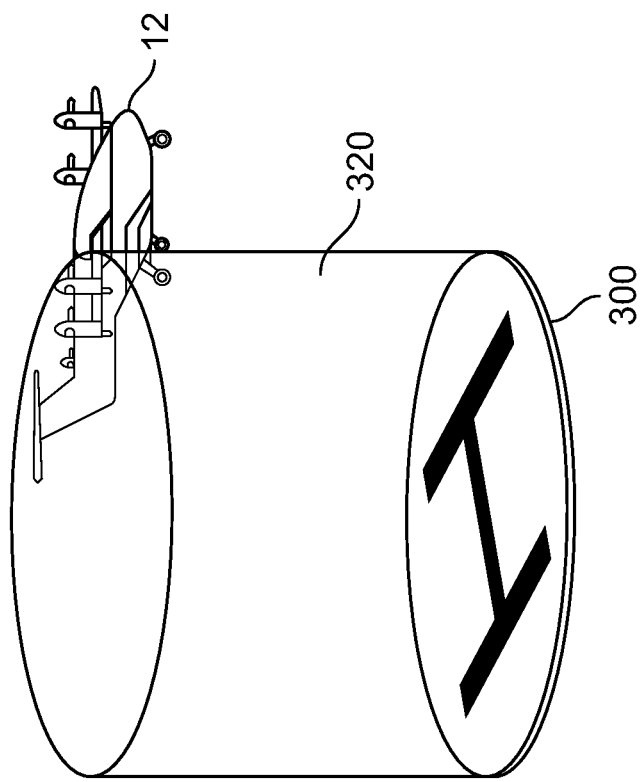

In some embodiments, landing aid system 10 includes a display generation module 30 configured to generate a display graphically highlighting a location of the target landing pad. In some embodiments, the display generation module 30 is configured to indicate a relative lateral alignment of the VTOL vehicle 12 and the target landing pad during a vertical descent for landing. In embodiments, display generation module is configured to receive images from camera 14 and localization data from image processing system 26 and to augment the images from the camera 14 with graphics or other display features to highlight the target landing pad and optionally also to indicate with graphics or other display features a relative alignment of the VTOL vehicle 12 and the target landing pad. In one embodiment, display generation module 30 is configured to determine a projection of a 3D volume from the target landing pad to a location of the VTOL vehicle 12 as known from data from global positioning system module 28. The 3D volume has the same size profile as the target landing pad, allowing a relative alignment or overlap between the VTOL vehicle position and the projection to be calculated. An exemplary display generated by display generation module 30 is illustrated in FIGS. 4A and 4B, which includes a representation of the target landing pad 300, a representation of the VTOL vehicle 12 and a representation of the projection of the 3D volume 320. In FIG. 4A, the display shows, graphically, a laterally misaligned VTOL vehicle 12 relative to the 3D projection, and thus relative to the target landing pad 300 in that the VTOL vehicle 12 is located only partially within, or outside of, the 3D volume 320. In FIG. 4B, the display shows a laterally aligned VTOL vehicle 12 and target landing pad 300 such that the VTOL vehicle 12 is located within a profile of the 3D volume 320. Other displays are envisaged that provide different augmentations of images from camera 14 to highlight a location of the target landing pad 300 and a relative lateral alignment of VTOL vehicle 12 therewith. In some exemplary displays, image data of target landing pad 300 and its surroundings (e.g. buildings) is obtained from navigation database 16 in order to generate a synthetic vision display during landing that provides deep augmentation of images from camera 14 during landing. In some embodiments, the projection method is used by autopilot system 24 to determine a lateral offset or alignment between VTOL vehicle 12 during vertical descent during landing to control lateral position of the VTOL vehicle 12.

In an exemplary embodiment, the landing aid system 10 includes a display system 22 including one or more display devices for outputting presentations from the display generation module 30. In embodiments, the one or more display devices are located remotely from VTOL vehicle 12 or in a cockpit of the VTOL vehicle 12 or a combination of both. For example, a display device of display system 22 may be included in proximity to a handset for remotely controlling movements of the VTOL vehicle 12.

System 100 further includes processing system 20 including one or more processors that are configured to execute computer programming instructions stored on non-transitory memory (not shown). Functions of the landing aid system 10 and steps of method 50 (FIG. 2) are executed by one or more processors of processing system 20 and the associated computer programming instructions. Modules and processing system 20 as described herein refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Whilst landing aid system 10 is described herein as being located in VTOL vehicle 12, it should be understood that remote or cloud processing capabilities and data sources could be used by VTOL vehicle 12. As such, one or more components described with respect to VTOL vehicle 12 may not necessarily be located onboard the VTOL vehicle 12.

Figure 2:
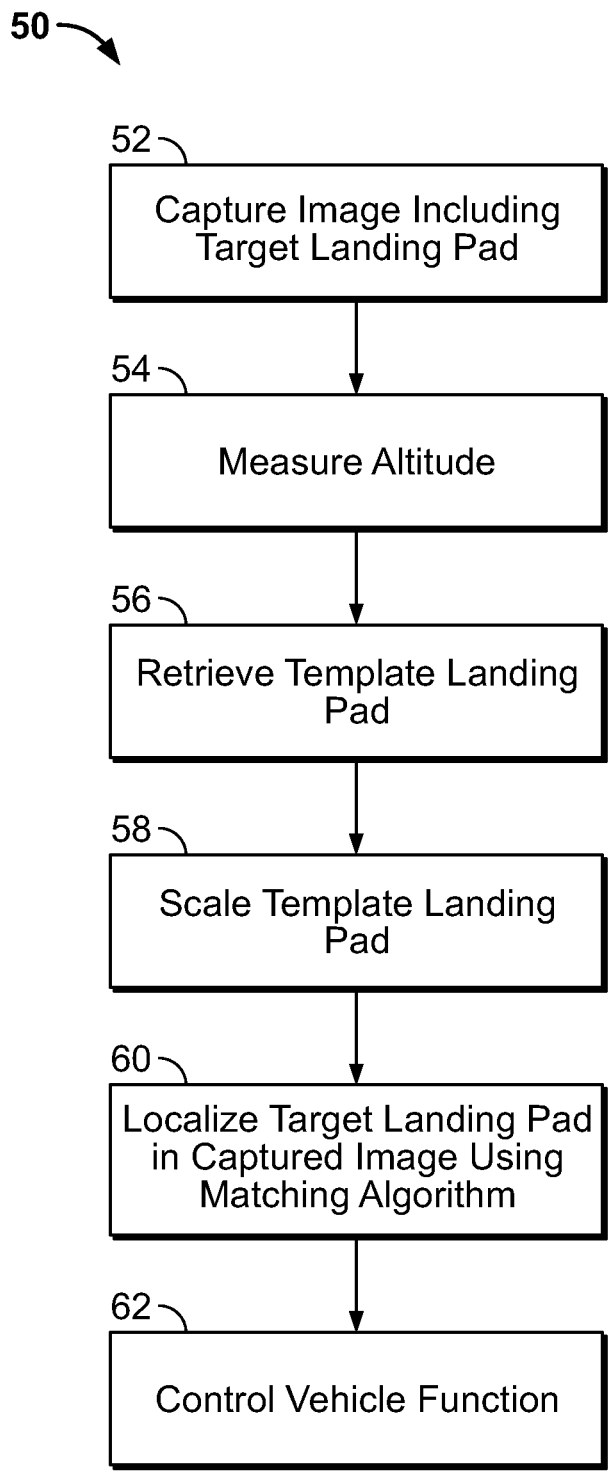
FIG. 2 is a flowchart of a landing aid method, in accordance with the present disclosure.

FIG. 2 is a flowchart illustrating an exemplary method 50 for providing landing assistance to the VTOL vehicle 12, in accordance with various embodiments. Steps of method 50 are performed by the processing system 20 (FIG. 1) executing computer programming instructions. Method 50 commences, in some embodiments, when the VTOL vehicle 12 is determined to be within a predetermined proximity of the target landing pad based on location of the VTOL vehicle 12 from global positioning system module 28 and retrieved location of the target landing pad from the navigation database 16.

Method 50 includes various steps for scaling a template landing pad image based on altitude data received from altimeter 18 and using the scaled image in a matching algorithm to localize and identify a target landing pad in received images from camera 14. The so identified target landing pad is useful in generating displays and/or directing the VTOL vehicle 12 during landing as one vehicle control example amongst other possibilities.

In the exemplary embodiment, method 50 includes step 52 of the camera 14 capturing an image that includes a target landing pad and step 54 of the altimeter 18 measuring altitude. Further, an image of a template landing pad 56 is retrieved from navigation database 16. In embodiments, the template landing pad image is included as a data field in navigation database 16 along with global coordinates of the landing pad that have allowed VTOL vehicle 12 to navigate to the target landing pad using autopilot system 24. In this way, image processing system 26 receives image data from camera 14, altitude data from altimeter 18 and template landing pad image data from navigation database 16.

Method 50 includes a step 58 of scaling, via the scaling module 34, the template landing pad proportionally to a relative height of the VTOL vehicle 12 above the target landing pad, which is based on the altitude data. In embodiments, a height of the target landing pad above ground, which is known from the navigation database 16, is subtracted from the altitude of the VTOL vehicle 12 to determine the height of the VTOL vehicle 12 above the target landing pad.

In accordance with various embodiments, method 50 further includes a step 60 of localizing, via the matching module 32, the target landing pad in the image captured by the camera 14 using a template matching algorithm or other image matching algorithm. In embodiments, the template matching algorithm searches image space of the image from the camera 14 to determine a best match with the scaled template landing pad, thereby identifying and localizing the target landing pad in the image.

In step 62, a function of the VTOL vehicle 12 is controlled based on localization data obtained from step 60. In one embodiment, autopilot system 24 laterally aligns the VTOL vehicle 12 relative to the target landing pad based on the localization data (specifically, a real world coordinate transformation thereof). In additional or alternative embodiments, a display is generated, via display generation module 30, providing guidance as to relative lateral alignment between VTOL vehicle 12 and target landing pad such as through a display of a 3D projected volume extending from the target landing pad in a height direction and a display of the VTOL vehicle 12 relative to the 3D projected volume, for example as shown in FIGS. 4A and 4B. In other embodiments, the display may include an indication of alignment or misalignment and when there is misalignment an indication of distance and direction of lateral movement required to achieve alignment with the target landing pad.

According to embodiments described herein, a low-cost landing aid is provided, which will help VTOL vehicles (e.g. eVTOL vehicles) to land safely on target landing pads. The present disclosure thus proposes providing "last mile" lateral and vertical landing assistance using a low cost sensor combination of camera and altimeter (e.g. radio altimeter).

In accordance with one embodiment described herein, a camera 14 (e.g. a monocular camera 14) in combination with a low cost altimeter 14 operate by the camera 14 initially capturing an image underneath the VTOL vehicle 12. The processing system 20 performs template matching leveraging measured height information by the altimeter 18. In some embodiments, an augmented image is produced that highlights the target landing pad, as detected by template matching, to assist crew to align the VTOL vehicle 12 laterally. One intuitive way, provided by way of example, to assist crew in determining lateral alignment is to present the ownship location in reference to a 3D volume 320 projected upward from the target landing pad 300. Other alternate representations include, but not limited to, are conventional lateral deviation scale indication on pilot display of display system 22. Once lateral alignment is established, crew (though crew controls (not shown)) and/or autopilot system 24 can begin the vertical decent using height measurement from the altimeter 18.

Embodiments of the landing aid system 10 have been described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The use cases and the depictions provided here are only exemplary in nature. It should be possible to use different symbology and semantics to accomplish the same concepts described herein.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

The invention claimed is:

1. A vertical takeoff and landing, VTOL, vehicle comprising:
   an image capture device;
   an altimeter;
   a database storing template landing pad image data for at least one template landing pad; and
   at least one processor in operable communication with the image capture device, the database and the altimeter, wherein the at least one processor is configured to:
   receive image data from the image capture device;
   receive altitude data from the altimeter;
   retrieve template landing pad image data for a target landing pad from the database;
   scale the template landing pad image data based on the altitude data using a scaling algorithm that determines a scaling parameter in proportion to a relative height of the VTOL vehicle above the target landing pad and multiplies dimensions of the template landing image data by the scaling parameter so that the template landing image data is proportionally transformed to a larger size as the relative height is reduced, wherein the relative height is determined based on the altitude data;
   compare the scaled template landing pad image data and the image data received from the image capture device to locate the target landing pad therein using a comparison algorithm that searches image space of the image data received from the image capture device to find a match for the scaled template landing pad image data, thereby providing target landing pad localization data; and
   control a function of the VTOL vehicle based on the target landing pad localization data.

2. The VTOL vehicle of claim 1, wherein the at least one processor is configured to control a function of the VTOL vehicle by executing an autopilot function based on the target landing pad localization data.

3. The VTOL vehicle of claim 1, wherein the at least one processor is configured to control a function of the VTOL vehicle by generating an augmented display including images based on the image data and an augmentation to indicate location of the target landing pad based on the target landing pad localization data.

4. The VTOL vehicle of claim 3, wherein the augmentation includes an indication of lateral alignment of the VTOL vehicle relative to the target landing pad.

5. The VTOL vehicle of claim 4, wherein the at least one processor is configured to project a 3D volume from the target landing pad based on the target landing pad localization data and to determine the indication of lateral offset of the VTOL vehicle relative to the projected 3D volume.

6. The VTOL vehicle of claim 5, wherein the at least one processor is configured to display a graphic indicating the VTOL vehicle position, the 3D volume and the target landing pad.

7. The VTOL vehicle of claim 1, wherein the at least one processor is configured to compare the scaled template landing pad image data and the image data received from the image capture device using a template matching algorithm.

8. The VTOL vehicle of claim 1, wherein the at least one processor is configured to compare the scaled template landing pad image data and the image data received from the image capture device using a template matching algorithm that incorporates rotation of the template landing pad image data.

9. The VTOL vehicle of claim 1, wherein the at least one processor is configured to access location data for the target landing pad from the database, to receive global position system data representing a location of the VTOL vehicle, and to initiate comparing of the scaled template landing pad image data and the image data received from the image capture device when the VTOL vehicle is within a predetermined proximity of the target landing pad based on the location data and the global position system data.

10. The VTOL vehicle of claim 9, comprising an autopilot system configured to fly the VTOL vehicle to the target landing pad based on the location data and the global position system data.

11. The VTOL vehicle of claim 1, wherein the altimeter is a radio altimeter.

12. A method for providing landing assistance in a vertical takeoff and landing, VTOL, vehicle, the method comprising:
   receiving, by at least one processor, image data from an image capture device;
   receiving, by the at least one processor, altitude data from an altimeter;
   retrieving, by the at least one processor, template landing pad image data for a target landing pad from a database;

scaling, by the at least one processor, the template landing pad image data based on the altitude data using a scaling algorithm that determines a scaling parameter in proportion to a relative height of the VTOL vehicle above the target landing pad and multiplies dimensions of the template landing image data by the scaling parameter so that the template landing image data is proportionally transformed to a larger size as the relative height is reduced, wherein the relative height is determined based on the altitude data;

comparing, by the at least one processor, the scaled template landing pad image data and the image data received from the image capture device to locate the target landing pad therein, thereby providing target landing pad localization data using a comparison algorithm that searches image space of the image data received from the image capture device to find a match for the scaled template landing pad image data; and controlling, by the at least one processor, a function of the VTOL vehicle based on the target landing pad localization data.

13. The method of claim 12, wherein the step controlling a function of the VTOL vehicle includes executing an autopilot function based on the target landing pad localization data.

14. The method of claim 12, wherein the step of controlling a function of the VTOL vehicle includes generating an augmented display including images based on the image data and an augmentation to indicate location of the target landing pad based on the target landing pad localization data.

15. The method of claim 14, wherein the augmentation includes an indication of lateral offset of the VTOL vehicle relative to the target landing pad.

16. The method of claim 15, comprising projecting, by the at least one processor, a 3D volume from the target landing pad based on the target landing pad localization data and determining the indication of lateral offset of the VTOL vehicle relative to the projected 3D volume.

17. The method of claim 16, wherein generating the augmented display includes displaying a graphic indicating the VTOL vehicle position, the 3D volume and the target landing pad.

18. The method of claim 12, wherein the step of comparing the scaled template landing pad image data and the image data received from the image capture device includes using a template matching algorithm.

19. The method of claim 12, wherein the step of comparing the scaled template landing pad image data and the image data received from the image capture device includes using a template matching algorithm that incorporates rotation of the template landing pad image data.

20. The method of claim 12, wherein the altimeter is a radio altimeter.

* * * * *